US007450897B2

(12) United States Patent  (10) Patent No.: US 7,450,897 B2
Kim  (45) Date of Patent: Nov. 11, 2008

(54) EXIT TRAY AND IMAGE FORMING APPARATUS INCLUDING THE SAME

(75) Inventor: Ho-gon Kim, Gumi-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 346 days.

(21) Appl. No.: 11/106,454

(22) Filed: Apr. 15, 2005

(65) Prior Publication Data

US 2005/0265763 A1  Dec. 1, 2005

(30) Foreign Application Priority Data

May 29, 2004  (KR)  ............... 10-2004-0038749

(51) Int. Cl.
*G03G 15/00* (2006.01)
(52) U.S. Cl. ................... 399/405; 399/381
(58) Field of Classification Search ............. 399/405, 399/381
See application file for complete search history.

(56) References Cited

U.S. PATENT DOCUMENTS 4,622,563 A * 11/1986 Watanabe ............... 347/222
5,774,139 A * 6/1998 Salzer et al. ............. 347/32
6,231,043 B1 * 5/2001 James et al. ............. 271/209
6,659,454 B1 * 12/2003 Smith et al. ............. 271/213
2004/0062587 A1 * 4/2004 Uchida et al. ............. 400/323

FOREIGN PATENT DOCUMENTS

| JP | 05-017063 | 1/1993 |
| JP | 05-278920 | 10/1993 |
| JP | 05-278921 | 10/1993 |
| JP | 08-012163 | 1/1996 |
| JP | 10-150513 | 6/1998 |
| JP | 2000-281260 | 10/2000 |
| JP | 2000-327203 | 11/2000 |

* cited by examiner

*Primary Examiner*—Anthony H. Nguyen
(74) *Attorney, Agent, or Firm*—Roylance, Abrams, Berdo & Goodman, L.L.P.

(57) ABSTRACT

An exit tray of an image forming apparatus having printing and scanning functions is adapted to stackably receive sheets of printed paper and scanned documents exiting from the body. The exit tray is insertable in and removable from the body of the image forming apparatus. The exit tray includes a first plate that is insertable in the body. A second plate is separable from the first plate by a predetermined distance, and may approach the first plate. Printed sheets of paper exiting from the body are stacked on either the first plate or the second plate. Scanned documents exiting from the body are stacked on the plate not receiving the printed sheets of paper.

20 Claims, 5 Drawing Sheets

EXIT TRAY AND IMAGE FORMING APPARATUS INCLUDING THE SAME

CROSS REFERENCE TO RELATED APPLICATIONS

This application claims the benefit of Korean Patent Application No. 10-2004-0038749, filed on May 29, 2004, in the Korean Intellectual Property Office, the entire disclosure of which is hereby incorporated by reference.

BACKGROUND OF THE INVENTION

1. Field of the Invention

The present invention relates to an image forming apparatus. More particularly, the present invention relates to an image forming apparatus that prints and scans.

2. Description of the Related Art

Generally, an image forming apparatus receives an image signal and prints the image signal as a visible image on a sheet of paper. Recently, an image forming apparatus has been used as a multi-function product that combines the functions of a printer, facsimile, and scanner. Hence, the multi-function product can print an image, as well as scan an image recorded on a document and reproduce the image on a sheet of paper or a display by converting the image into digital image information.

FIG. 1 illustrates a conventional multi-function product that uses an inkjet recording head that ejects ink onto a sheet of paper to print an image.

Referring to FIG. 1, the image forming apparatus 10 includes a body 11 having a scanning unit (not shown) that scans an image recorded on a document and a printing unit that prints an image on a sheet of paper. An operating panel 12 includes a plurality of function keys and a display on the front of the body 11. A document feed tray 15 that receives documents to be scanned is disposed in the rear of the operating panel 12. Sheets of paper to be printed are stacked on a paper feed tray 17 disposed behind the document feed tray 15.

Printed sheets of paper are stacked on a paper exit tray 20, and scanned documents are stacked on a document exit tray 22. The paper exit tray 20 and the document exit tray 22 are disposed under the operating panel 12.

The image forming apparatus 10 may be placed on a desk when used in an office or a house. The paper exit tray 20 and the document exit tray 22 remain protruded from the body 11 even when the image forming apparatus 10 is not printing an image or scanning a document. Accordingly, the protruded paper exit tray 20 and the document exit tray 22 hinder efficient use of desk space and thus undermines work efficiency.

In addition, when the image forming apparatus 10 is packed in a box, the paper exit tray 20 and the document exit tray 22 must be detached from the body 11 and packed separately in the box. Accordingly, a large box is required to pack the image forming apparatus 10, thereby decreasing shipping efficiency while increasing shipping costs of the image forming apparatus 10.

Accordingly, there is a need for an image forming apparatus that has an improved exit tray that is insertable in the body of the image forming apparatus.

SUMMARY OF THE INVENTION

The present invention relates to an exit tray that is insertable into a body of an image forming apparatus when printing or scanning is not performed.

The present invention also relates to an exit tray including a paper exit plate upon which printed sheets of paper exiting from a body of an image forming apparatus are stacked, and a document exit plate upon which scanned documents exiting from the body are stacked. The paper and document exit plates are coupled to one another to be inserted together into the body.

According to an aspect of the present invention, an exit tray is loaded into a body of an image forming apparatus having printing and scanning functions. Sheets of printed paper and scanned documents exiting from the body are stacked upon the exit tray, which includes a first plate insertable in the body and a second plate pivotable from the first plate by a predetermined distance and that may approach the first plate.

Printed sheets of paper exiting from the body are stacked on either the first plate or the second plate. Scanned documents exiting from the body are stacked on the plate not receiving the printed sheets of paper.

The exit tray may further include a coupling member, one side of which is hinge-joined to the first plate and the other side of which is hinge-joined to the second plate. A first tension spring is wound around a region where the first plate is hinge-joined to the coupling member. A second tension spring is wound around a region where the second plate is hinge-joined to the coupling member. The second plate may be elastically biased to be separated from the first plate by the predetermined distance.

The coupling member may be diagonally coupled to the first plate. The coupling member may be coupled to a side of each of the first plate and the second plate to prevent obstructing or interfering the sheets of paper or documents stacked thereon.

According to another aspect of the present invention, an image forming apparatus includes a body having a printing unit printing an image on a sheet of paper and a scanning unit scanning an image recorded on a document. An exit tray is adapted to stackably receive sheets of paper with images printed by the printing unit and documents with images scanned by the scanning unit exiting from the body.

The exit tray includes a first plate insertable in the body and a second plate pivotable from the first plate by a predetermined distance and that may approach the first plate.

Printed sheets of paper exiting from the body are stacked on either the first plate or the second plate. Scanned documents exiting from the body are stacked on the plate not receiving the printed sheets.

The exit tray may further include a coupling member, one side of which is hinge-joined to the first plate and the other side of which is hinge-joined to the second plate. A first tension spring is wound around a region where the first plate is hinge-joined to the coupling member. A second tension spring is wound around a region where the second plate is hinge-joined to the coupling member.

The second plate may be elastically biased to be separated from the first plate by the predetermined distance. The second plate may approach the first plate when the exit tray is inserted in the body.

The coupling member of the exit tray may be diagonally coupled to the first plate. The coupling member of the exit tray may be coupled to a side of each of the first plate and the second plate to prevent obstructing or interfering the sheets of paper or documents stacked thereon.

The body may include a member, and, when the exit tray is inserted in the body, the second plate may slide in contact with the member and approach the first plate.

Gear teeth may be formed on a bottom of the first plate. The body may include a pinion gear engaging the gear teeth of the first plate. The exit tray may be inserted in or pulled out of the body according to the direction of rotation of the pinion gear.

The pinion gear may rotate in a direction in which the exit tray is inserted in the body when printing or scanning is not performed for a predetermined period of time.

The pinion gear may rotate in a direction in which the exit tray protrudes from the body when printing or scanning is performed.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

The above and other features and advantages of the present invention will become more apparent by describing in detail exemplary embodiments thereof with reference to the attached drawings, in which:

FIG. 4A is an enlarged elevational view of a tension spring of FIG. 4;

Throughout the drawings, like reference numerals will be understood to refer to like parts, components and structures.

DETAILED DESCRIPTION OF EXEMPLARY EMBODIMENTS

Exemplary embodiments of the present invention are described more fully with reference to the accompanying drawings, in which exemplary embodiments of the invention are shown. The present invention may, however, be embodied in many different forms and should not be construed as being limited to the exemplary embodiments set forth herein. These exemplary embodiments are provided for a thorough and complete disclosure, and to fully convey the concept of the present invention to those skilled in the art.

Figure 1:
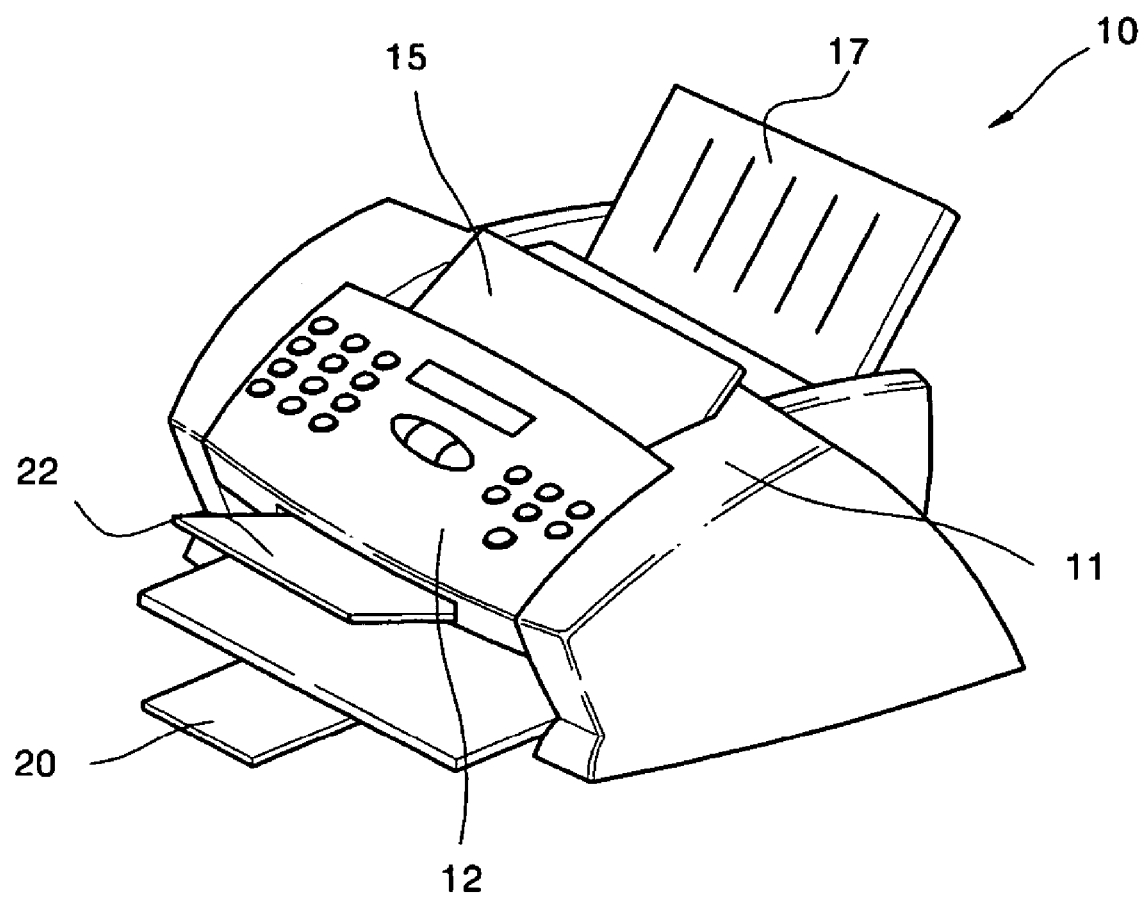
FIG. 1 is a perspective view of a conventional image forming apparatus.
Figure 2:
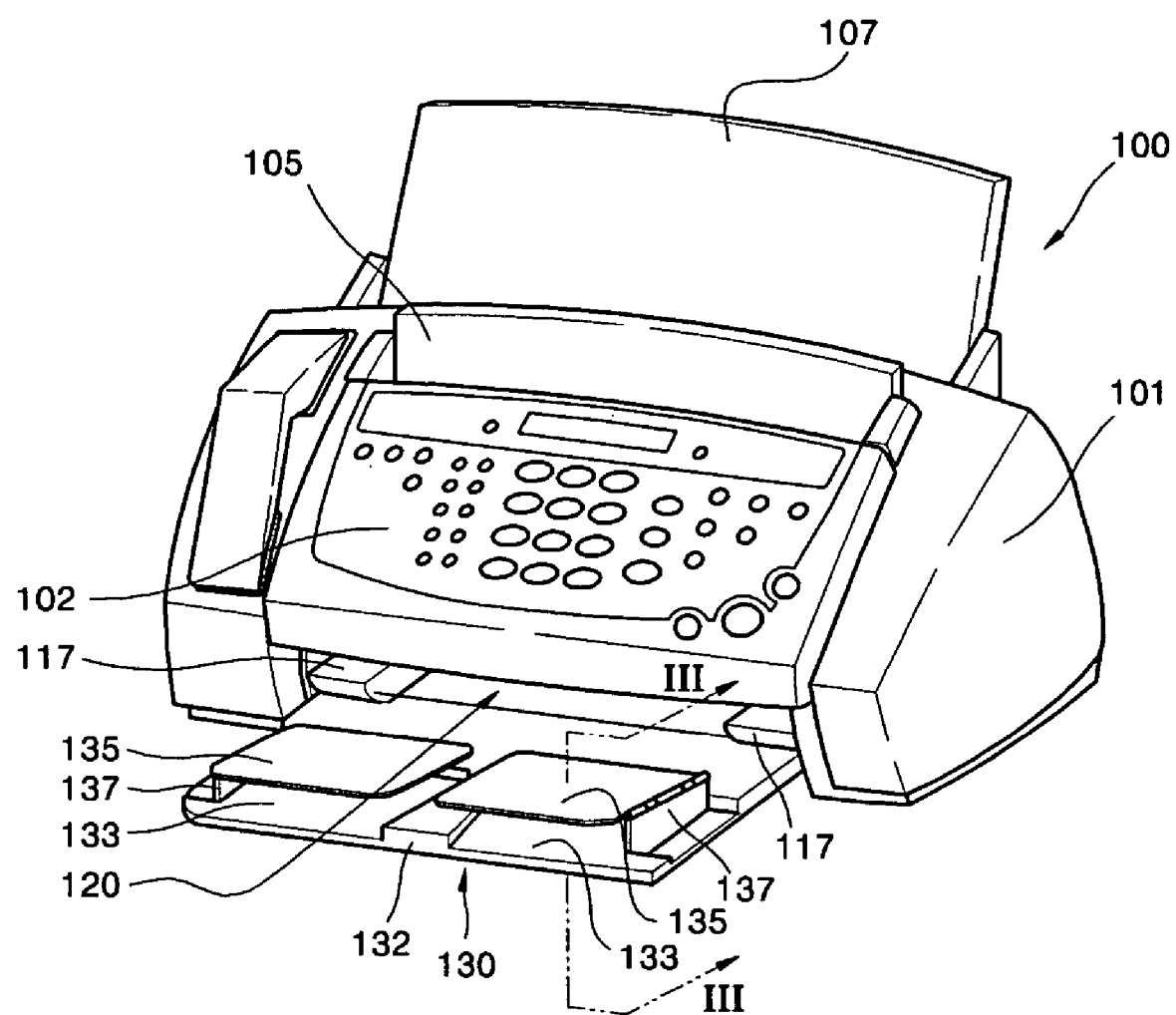
FIG. 2 is a perspective view of an image forming apparatus according to a first embodiment of the present invention.
Figures 3, 3A:
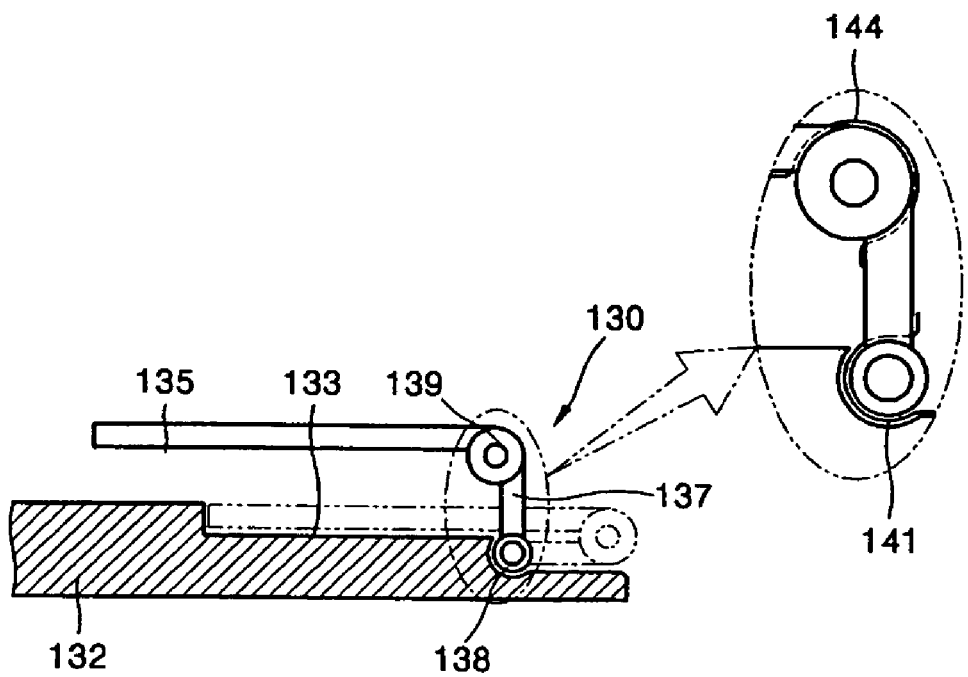
FIG. 3 is a sectional view of an exit tray taken along line III-III of FIG. 2.
FIG. 3A is an enlarged elevational view of the first and second hinges of the exit tray of FIG. 3.
Figure 4:
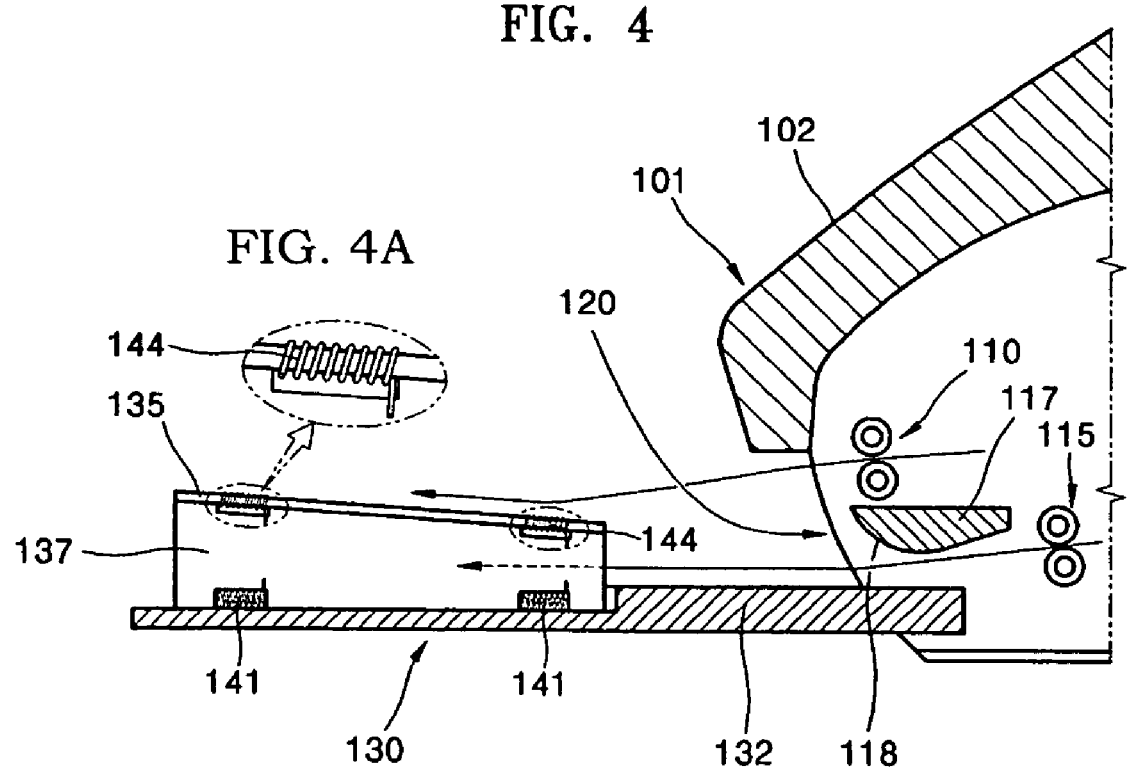
FIG. 4 is an elevational view in partial cross section of the image forming apparatus when the exit tray protrudes from a body of the image forming apparatus.
Figure 5:
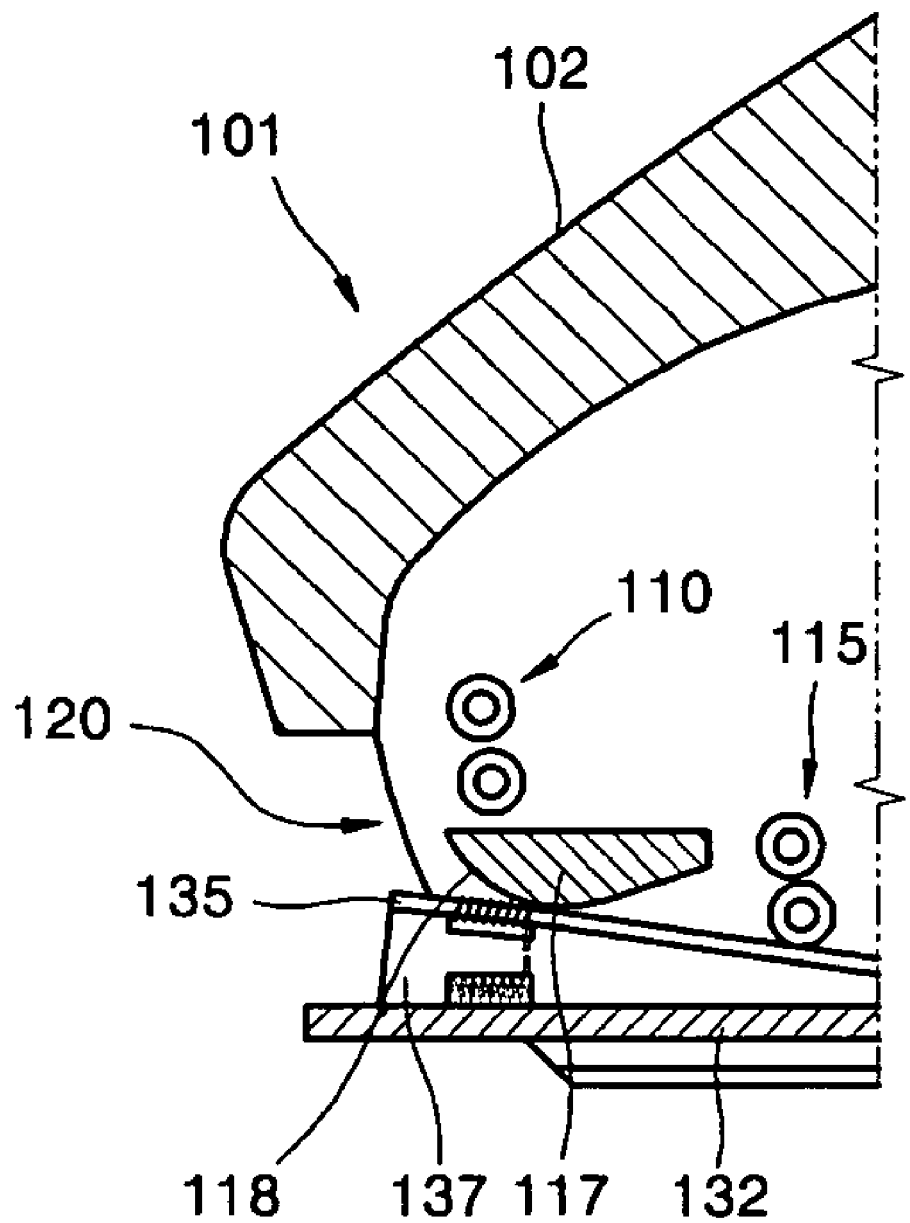
FIG. 5 is an elevational view in partial cross section of the image forming apparatus when the exit tray is inserted in the body of the image forming apparatus.

FIG. 2 is a perspective view of an image forming apparatus according to a first embodiment of the present invention. FIGS. 3 and 3A are sectional views of an exit tray taken along line III-III of FIG. 2. FIGS. 4 and 5 illustrate the image forming apparatus of FIG. 2. FIG. 4 illustrates the image forming apparatus when the exit tray protrudes from a body of the image forming apparatus. FIG. 5 illustrates the image forming apparatus when the exit tray is inserted into the body of the image forming apparatus.

Referring to FIGS. 2 and 3, the image forming apparatus 100 includes a body 101 having a scanning unit (not shown) that scans an image recorded on a document and a printing unit that prints an image on a sheet of paper. An operating panel 102 includes a plurality of function keys and a display on the front of the body 101. The scanning unit may include a contact image sensor (CIS) or a charge coupled device (CCD). The printing unit may include an inkjet recording head ejecting ink onto a sheet of paper to form an image on the sheet of paper.

A document feed tray 105 whereon documents to be scanned are stacked is disposed in the rear of the operating panel 102. A paper feed tray 107 whereon sheets of paper to be printed are stacked is disposed behind the document feed tray 105. Scanned documents and printed papers exit through an exit aperture 120 disposed under the operating panel 102 after passing through the body 101. An exit tray 130 whereon the documents or sheets of paper exiting through the exit aperture 120 are stacked is also disposed under the operating panel 102.

The exit tray 130 includes a first plate 132 upon which sheets of paper exiting through the exit aperture 120 are stacked and a pair of second plates 135 disposed above the first plate 132 upon which documents exiting through the exit aperture 120 are stacked. The first plate 132 may be inserted in the body 101 or pulled out of the body 101. Each of the second plates 135 is coupled to the first plate 132 by each of coupling members 137.

One side of the coupling member 137 is hingedly connected to the first plate 132 to form a first hinge joint 138, and the other side of the coupling member 137 is hingedly connected to the second plate 135 to form a second hinge joint 139. The first hinge joint 138 controls the coupling member 137 to rotate at an angle ranging from 0 to 90 degrees with respect to the first plate 132. The second hinge joint 139 controls the second plate 135 to rotate at an angle ranging from 0 to 90 degrees. Preferably, the angle range of the second hinge joint is substantially the same as the angle range within which the coupling member 137 rotates with respect to the first plate 132. A rotation angle may also be controlled by forming stoppers in the first and second hinge joints 138 and 139, which, however, are not described in this disclosure since it is obvious to those skilled in the art.

The second plate 135 may be disposed a predetermined distance above the first plate 132 as indicated by a solid line or attached to the first plate 132 as indicated by a chain double-dashed line in FIG. 3. When the second plate 135 is separated from the first plate 132 by the first and the second hinge-joints 138 and 139 controlling the rotation angle, the coupling member 137 is diagonally slanted with respect to the first plate 132 (not clearly illustrated in FIGS. 2 and 3). When the second plate 135 is disposed proximal the first plate 132, a surface 133 formed in a portion of the first plate 132 accommodates the second plate 135.

A first tension spring 141 is wound around the first hinge joint 138 and elastically biases the coupling member 137 to stand diagonally with respect to the first plate 132. A second tension spring 144 is wound around the second hinge joint 139 and elastically biases the second plate 135 to extend roughly horizontally at a predetermined angle with respect to the coupling member 137. The second plate 135 is elastically biased to be separated from the first plate 132 by a predetermined distance by the first and second hinge joints 138 and 139 of the coupling member 137 and the first and second tension springs 141 and 144 wound around the first and second hinge joints 138 and 139.

The coupling member 137 is hingedly-connected to a side of each of the first plate 132 and the second plate 135 to not obstruct or interfere with the sheets of paper exiting from the body 101 and stacked on the first plate 132. The second plate 135 is slanted such that a distance between the second plate 135 and the first plate 132 becomes greater in a direction toward the front of the second plate 135 (that is, away from the body 101). Therefore, a user may easily take out sheets of paper stacked on the first plate 132 without being bothered by the second plate 135.

Referring to FIGS. 4 and 4A, a member 117 is disposed inside the exit aperture 120. A sloping surface 118 is formed on the lower front of the member 117. When a user pushes the first plate 132 into the body 101 to insert the exit tray 130 in the body 101, the second plate 135 separated from the first plate 132 slides down and is pressed under the sloping surface 118 while contacting the sloping surface 118 and approaching the first plate 132. As a result, the second plate 135 is inserted into the body 101 together with the first plate 132, as shown in FIG. 5.

Since the coupling member 137 is slanted diagonally with respect to the first plate 132, when the second plate 135 contacts the member 117, the coupling member 137 rotates toward the first plate 132 to facilitate insertion of the exit tray 130 in the body 101.

When a user pulls the front of the first plate 132 to pull the exit tray 130 out of the body 101, the second plate 135 elastically biased by the first and second tension springs 141 and 144 slides up the sloping surface 118 while contacting the sloping surface 118 and is gradually separated from the first plate 132. When the first plate 132 is pulled out until the second plate 135 is pulled out of the body 101, the second plate 135 is separated from the first plate 132 by the same distance as the second plate 135 was initially separated from the first plate 132.

A first path along which scanned documents exit is preferably formed above the member 117. A document exit roller 110 forcing the scanned documents to exit is disposed on the first path. In addition, a second path along which printed sheets of paper exit is preferably formed under the member 117. A paper exit roller 115 forcing the printed sheets of paper to exit is disposed on the second path.

An operation of the image forming apparatus 100 thus configured will now be described. When a user desires to print images using the image forming apparatus 100, the user must stack sheets of paper on the paper feed tray 107 and input a print command. Then, the sheets of paper stacked on the paper feed tray 107 are fed into the body 101 one by one. The sheets of paper fed into the body 101 pass through the printing unit (not shown), which, in turn, prints images on the sheets of paper. The printed sheets of paper are forced to exit from the body 101 by the paper exit roller 115 and are stacked on the first plate 132.

When a user desires to scan images recorded on documents using the image forming apparatus 100, the user stacks the documents on the document feed tray 105 and inputs a scan command. Then, the documents stacked on the document feed tray 105 are fed into the body 101 one by one. The documents fed into the body 101 pass through the scanning unit (not shown), which, in turn, scans the images on the documents. The scanned documents are forced to exit from the body 101 by the document exit roller 110 and are stacked on the second plate 135.

When the image forming apparatus 100 is not used, the first plate 132 may be pushed into the body 101. The second plate 135 enters the body 101 along with the first plate 132. The second plate 135 slides down and is pressed under the sloping surface 118 of the member 117 by contacting the sloping surface 118, thereby causing the second plate 135 to approach the first plate 132. As a result, the exit tray 130 is inserted into the body 101.

When the image forming apparatus 100 is used, the first plate 132 is pulled forward (that is, out from a stored position within the body 101). The second plate 135 is pulled forward along with the first plate 132. The second plate 135 is separated from the first plate 132 by the same distance as the second plate 135 was initially separated from the first plate 132 by the restoration force of the first and second tension springs 141 and 144. Therefore, printed sheets of paper and scanned documents may be stacked separately.

Figure 6:
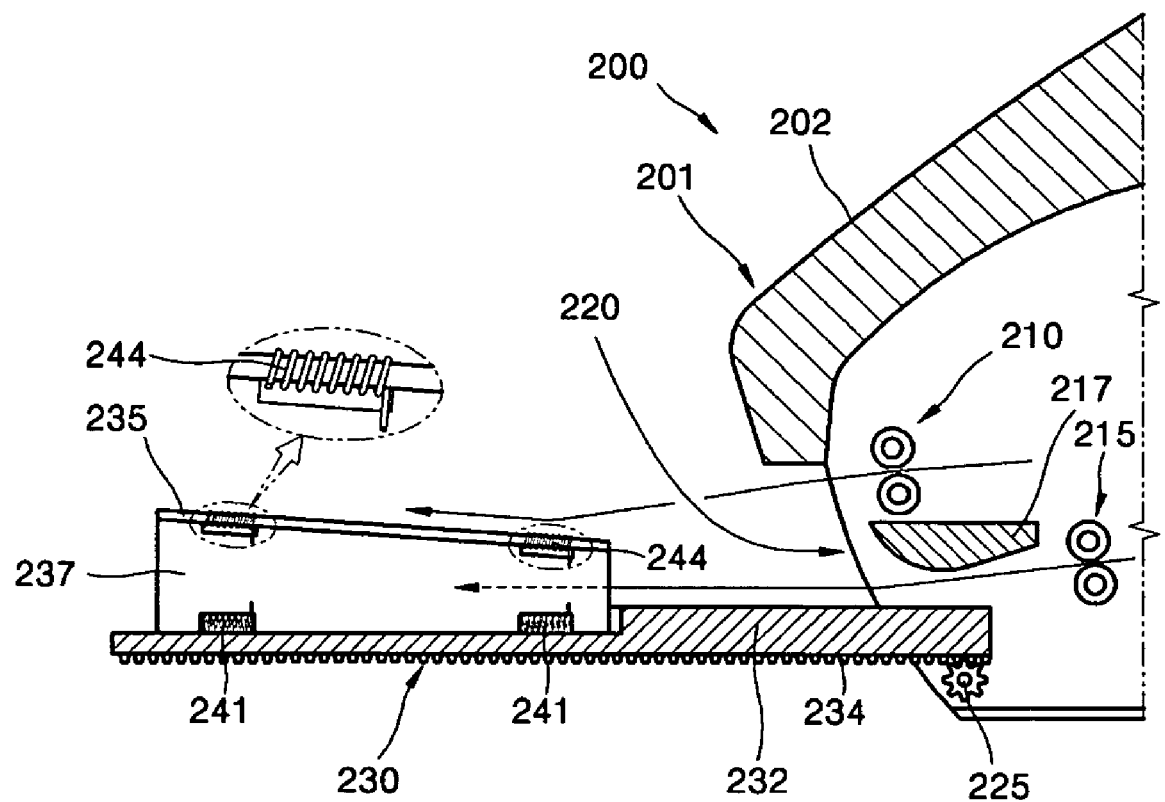
FIG. 6 is an elevational view in partial cross section of an image forming apparatus according to a second embodiment of the present invention.

FIG. 6 is a sectional view of an image forming apparatus 200 according to a second embodiment of the present invention. Referring to FIG. 6, like the image forming apparatus 100 according to the first embodiment of the present invention, the image forming apparatus 200 according to the second embodiment of the present invention includes an operating panel 202 on the front of a body 201 and an exit tray 230 that is insertable in the body 201 under the operating panel 202. A member 217, a document exit roller 210, and a paper exit roller 215 are disposed inside an exit aperture 220 of the body 201 of the image forming apparatus 200. Like the exit tray 130 according to the first embodiment of the present invention, the exit tray 230 also includes a first plate 232, a second plate 235, a coupling member 237 coupling the first and second plates 232 and 235, a first tension spring 241, and a second tension spring 244.

A gear portion 234 with teeth is disposed on a bottom surface of the first plate 232. A pinion gear 225 adapted to engage the gear portion 234 is disposed in the body 201. The pinion gear 225 may be connected to a motor (not shown), which provides a turning force to the paper exit roller 215 and to the pinion gear 225. Alternatively, the pinion gear 225 may receive the turning force from a separate motor installed to drive only the pinion gear 225.

When printing or scanning is not performed for a predetermined period of time when the exit tray 230 protrudes from the body 201 (a protruded position), the motor providing the turning force to the pinion gear 225 may automatically rotate the pinion gear 225 in a direction in which the exit tray 230 is inserted into the body 210 to the stored position. Conversely, when printing or scanning is performed when the exit tray 230 is inserted in the body 201, the motor may automatically rotate the pinion gear 235 in a direction to move the exit tray 230 out of the body 201 to a protruded position, as shown in FIG. 6.

When the pinion gear 225 rotates in a clockwise direction, the first plate 232 is moved into the body 201. Then, the second plate 235 is also moved into the body 201 along with the first plate 232 by contacting the member 217, thereby approaching the first plate 232. As a result, the exit tray 230 is inserted in the body 201.

Conversely, when the pinion gear 225 rotates in a counter-clockwise direction, the first plate 232 and the second plate 235, which is connected to the first plate 232, are moved out of the body 201. The second plate 235 is separated from the first plate 232 by substantially the same distance as the second plate 235 was initially separated from the first plate 232 by the restoration force of the first and second tension springs 241 and 244. As a result, the exit tray 230 is in a protruded position (that is, the exit tray extends outwardly from the body 201).

An exit tray and an image forming apparatus according to exemplary embodiments of the present invention have the following advantages. First, work efficiency is enhanced since office space may be more efficiently used by inserting the exit tray in a body of the image forming apparatus when the image forming apparatus is not being used. Second, since the image forming apparatus is packed in a box with the exit tray inserted therein, a large box is not required, thereby improving shipping efficiency and reducing shipping costs. Third, according to an embodiment of the present invention, the exit tray is automatically inserted in or moved out of the body, thereby negating the need for manually inserting and moving the exit tray in and out of the body.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An exit tray of an image forming apparatus, which prints, scans and discharges sheets of printed paper and scanned documents, the exit tray comprising:
   a first plate insertable in a body of the image forming apparatus; and
   a second plate movably connected to the first plate, the second plate being movable between a first position a predetermined distance from the first plate and a second position proximal the first plate,
   wherein the printed sheets of paper exiting from the body are stacked on either the first plate or the second plate, and scanned documents exiting from the body are stacked on the first plate or the second plate that does not receive the printed sheets of paper.

2. The exit tray of claim 1, wherein
   a coupling member has a first side hingedly connected to the first plate and a second side hingedly connected to the second plate;
   a first tension spring is wound around a first region where the first plate is hingedly connected to the coupling member; and
   a second tension spring is wound around a second region where the second plate is hingedly connected to the coupling member, the second plate being elastically biased to be separated from the first plate by the predetermined distance.

3. The exit tray of claim 2, wherein
   the coupling member is diagonally disposed with respect to the first plate when the second plate is in the first position.

4. The exit tray of claim 2, wherein
   the coupling member is coupled to a side of each of the first plate and the second plate to substantially prevent interfering with the printed sheets of paper and the scanned documents stacked on the first and second plates.

5. The image forming apparatus of claim 1, wherein
   a recess formed in the first plate is adapted to receive the second plate when the second plate is in the second position.

6. The image forming apparatus of claim 1, wherein
   the second plate is substantially not parallel to the first plate when the second plate is in the first position.

7. An image forming apparatus adapted to print and scan, comprising:
   a body;
   an exit tray adapted to stackably receive sheets of paper that exit from the body, the exit tray including
   a first plate insertable in the body; and
   a second plate movable between a first position a predetermined distance from the first plate and a second position proximal the first plate,
   wherein printed sheets of paper exiting from the body are stacked on either the first plate or the second plate, and scanned documents exiting from the body are stacked on the first plate or the second plate that does not receive the printed sheets of paper.

8. The image forming apparatus of claim 7, wherein
   a coupling member has a first side hingedly connected to the first plate and a second side hingedly connected to the second plate;
   a first tension spring is wound around a first region where the first plate is hingedly connected to the coupling member; and
   a second tension spring is wound around a second region where the second plate is hingedly connected to the coupling member, the second plate being elastically biased to be separated from the first plate by the predetermined distance and being movable to the second position proximal the first plate when the exit tray is inserted in the body.

9. The image forming apparatus of claim 8, wherein
   the coupling member of the exit tray is diagonally disposed with respect to the first plate when the second plate is in the first position.

10. The image forming apparatus of claim 8, wherein
    the coupling member is coupled to a side of each of the first and second plates to substantially prevent interfering with the printed sheets of paper or the scanned documents stacked on the first and second plates.

11. The image forming apparatus of claim 8, wherein
    a member disposed in the body engages the second plate as the exit tray is inserted in the body to move the second plate to the second position proximal the first plate.

12. The image forming apparatus of claim 7, wherein
    gear teeth are formed on a bottom of the first plate; and
    a pinion gear is disposed in the body to engage the gear teeth of the first plate, the exit tray being moved in or out of the body by rotation of the pinion gear.

13. The image forming apparatus of claim 12, wherein
    the pinion gear rotates in a first direction to move the exit tray into the body when printing or scanning is not performed for a predetermined period of time.

14. The image forming apparatus of claim 12, wherein
    the pinion gear rotates in a second direction to move the exit tray out of the body when printing or scanning is performed.

15. The image forming apparatus of claim 7, wherein
    a recess formed in the first plate is adapted to receive the second plate when the second plate is in the second position.

16. The image forming apparatus of claim 11, wherein
    a third plate is movably connected to the first plate.

17. The image forming apparatus of claim 16, wherein
    a second recess formed in the first plate is adapted to receive the third plate when the third plate is in the second position.

18. The image forming apparatus of claim 17, wherein
    a second member disposed in the body engages the third plate as the exit tray is inserted in the body to move the third plate to the second position proximal the first plate.

19. The image forming apparatus of claim 7, wherein
    the second plate is substantially not parallel to the first plate when the second plate is in the first position.

20. The image forming apparatus of claim 19, wherein
    the second plate slopes upwardly away from the body of image forming apparatus when the second plate is in the first position.

* * * * *